US008519924B2

United States Patent
Hasegawa

(10) Patent No.: US 8,519,924 B2
(45) Date of Patent: Aug. 27, 2013

(54) IMAGE DISPLAY DEVICE AND METHOD OF DRIVING LIQUID CRYSTAL PANEL

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 2215 days.

(21) Appl. No.: 11/230,684

(22) Filed: Sep. 21, 2005

(65) Prior Publication Data

US 2006/0097980 A1    May 11, 2006

(30) Foreign Application Priority Data

Nov. 10, 2004 (JP) ................... 2004-326030

(51) Int. Cl.
- G09G 3/36 (2006.01)
- G09G 5/00 (2006.01)
- G06F 3/038 (2013.01)
- G02F 1/133 (2006.01)

(52) U.S. Cl.
USPC .......... 345/87; 345/94; 345/208; 349/33

(58) Field of Classification Search
USPC .......... 345/87, 88, 89, 90, 92, 94, 95, 96, 345/98, 99, 100, 103, 204, 205, 206, 207, 345/208, 209, 210, 211, 214, 690, 691, 692, 345/693; 349/33, 34, 36, 37, 38, 39, 41, 349/42, 46, 47, 48, 52, 54, 61
See application file for complete search history.

(56) References Cited

U.S. PATENT DOCUMENTS

| | | | | |
|---|---|---|---|---|
| 5,347,294 | A * | 9/1994 | Usui et al. | 345/89 |
| 6,414,669 | B1 * | 7/2002 | Masazumi | 345/98 |
| 6,501,451 | B1 * | 12/2002 | Sakashita | 345/87 |
| 6,703,993 | B2 * | 3/2004 | Miura et al. | 345/87 |
| 6,809,717 | B2 * | 10/2004 | Asao et al. | 345/102 |
| 6,833,886 | B2 * | 12/2004 | Suzuki et al. | 349/87 |
| 6,977,636 | B2 * | 12/2005 | Jinda et al. | 345/94 |
| 7,161,573 | B1 * | 1/2007 | Takatori et al. | 345/96 |
| 7,277,076 | B2 * | 10/2007 | Shiomi et al. | 345/89 |
| 7,342,556 | B2 * | 3/2008 | Oue et al. | 345/33 |
| 7,358,948 | B2 * | 4/2008 | Shiomi et al. | 345/89 |
| 7,427,974 | B2 * | 9/2008 | Asao et al. | 345/89 |
| 2002/0033789 | A1 * | 3/2002 | Miyata et al. | 345/89 |
| 2003/0107538 | A1 * | 6/2003 | Asao et al. | 345/87 |
| 2004/0135777 | A1 * | 7/2004 | Shiomi et al. | 345/204 |

FOREIGN PATENT DOCUMENTS

| | | |
|---|---|---|
| JP | A 03-174186 | 7/1991 |
| JP | A 2001-331154 | 11/2001 |
| JP | A 2004-246118 | 9/2004 |

* cited by examiner

*Primary Examiner* — Ariel Balaoing
*Assistant Examiner* — Christopher Kohlman
(74) *Attorney, Agent, or Firm* — Oliff & Berridge, PLC

(57) ABSTRACT

Aspects of the invention can provide an image display device, including a liquid crystal panel used to display an image, a light source, a light transmission unit that can make a light from the light source pass through pixels only for a predetermined length of time within a frame cycle of the image, a drive signal-generating unit that can generate a drive signal to periodically vibrate a transmissivity of each pixel of the liquid crystal panel, and a phase control unit that can control in phase the drive signal based on tone data carried by an image signal.

3 Claims, 14 Drawing Sheets

IMAGE DISPLAY DEVICE AND METHOD OF DRIVING LIQUID CRYSTAL PANEL

BACKGROUND

This application claims the benefit of Japanese Patent Application No. 2004-326030, filed Nov. 10, 2004. The entire disclosure of the prior application is hereby incorporated by reference herein in its entirety.

Aspects of the invention can relate to an image display device having a liquid crystal panel used to display a still image and a moving image, and a method of driving the liquid crystal panel.

A related art image display device with a liquid crystal panel not only takes the place of a CRT (cathode-Ray Tube) and are used as a display for a personal computer in most cases, but they can also be utilized as a display device of television set or a projection type display device (liquid crystal projector).

In the principle on which an image display device expresses a tone, the change in light transmissivity in response to a voltage level applied to each pixel is utilized. However, the response speed at which the light transmissivity is changed with respect to the applied voltage actually is slow and as such, degradation of image quality including tailing and blurring arises particularly in displaying a moving picture.

For example, the color standard of analog television system of NTSC (National Television Standards Committee), which is typically used in U.S.A., Japan, etc., requires to display 29.97 frames per second. That is, this means that the time involved in displaying one frame is about 33 msec. However, it has been known that a typical active matrix type liquid crystal panel needs, as its usual response time, 20 to 30 msec. Hence, simply supplying a drive signal (voltage) at a timing desired for display to each pixel of the liquid crystal panel does not necessarily allow an intended transmissivity to be achieved.

As a method to prevent the degradation of quality for display a moving image due to such response characteristic, it has been suggested to utilize the property that liquid crystal materials have in general, the larger the change in the applied voltage is, the higher the response speed reaches. Such suggestion is made, for example, in the following documents: Japanese Patent No. 2650479; Japanese Patent Application Publications JP-A-2001-331154; and JP-A-2004-246118.

A method disclosed in Japanese Patent No. 2650479 includes: predetermining a variable transmissivity curve based on the mathematical expression that associates applied voltages with response times; storing the variable transmissivity curve in a data table; and making a corrector refer to a correction value derived from the curve and correct a voltage so as to establish a correspondence with a required transmissivity. However, according to the method, the variable transmissivity curve is estimated from a plurality of fields (successive three or more fields) to make the correction based on the estimation and as such, all the parts of the variable transmissivity curve on the plurality of fields, which are necessary for the estimation, will be kept in a table for each pixel. Therefore, large capacities of storage means including a ROM (Read Only Memory) are required for strict control. In addition, when it is desired to cope with various correction patterns, tables exclusively for such patterns must be prepared.

A method disclosed in JP-A-2001-331154 has been suggested to solve the above problems. According to the method, a corrected amount is selected based on the difference between a video signal for the immediately preceding field and a video signal for a current field, on which the operation of addition or multiplication is performed.

However, according to the method, only the information concerning one field is used and as such, there is the case where image degradation cannot be surely prevented. In such case, depending on the situation, an adverse effect such as noise arises, or a sufficient correction effect cannot to be obtained.

In JP-A-2004-246118, a suggestion to overcome the disadvantage of the method disclosed in JP-A-2001-331154 is made. However, according to the suggestion, a sufficient correction effect cannot be obtained in principle because only video signals for current and immediately preceding fields are used for the correction.

SUMMARY

An aspect of the invention can provide an image display device capable of displaying an image more clearly without degrading image quality even with a liquid crystal panel slow in response speed, and a method of driving the liquid crystal panel.

An image display device according to an aspect of the invention can include a liquid crystal panel used to display an image (including a still image and a moving image), a light source, a light transmission unit that makes a light from the light source pass through pixels only for a predetermined length of time within a frame cycle of the image, a drive signal-generating unit that generates a drive signal to periodically vibrate a transmissivity of each pixel of the liquid crystal panel, and a phase control unit that controls in phase the drive signal based on tone data carried by an image signal.

According to the aspect of the invention, the drive signal-generating unit and phase control unit drive use a drive signal subjected to PM modulation (Phase Modulation) to drive the liquid crystal panel, change in phase the transmissivity that changes while vibrating periodically, and change the transmissivity with respect to a light passing through the panel for a predetermined length of time within a frame cycle to express a tone. Therefore, a tone can be expressed regardless of the response characteristics of liquid crystal panels, and the development of quality degradation such as "tailing" and "blurring" due to the time response of each pixel can be prevented. In addition, the light transmission unit has lights intermittently passing through the liquid crystal panels and as such, the feeling of residual image stemming from the conventional holding display system vanishes and thus a sharper and more beautiful picture can be obtained.

As for the image display device, it is desirable that the drive signal-generating unit alternately outputs drive signals different in voltage level thereby to vibrate the transmissivity. This enables the transmissivity to vibrate surely, and can facilitate phase control using a combination of usual rectangular waves.

As for the image display device, it is desirable to include a correction unit that corrects the drive signals so as to make time variations in the transmissivities of the pixels uniform.

According to the aspect of the invention, the correction unit corrects drive signals so as to adapt to the characteristics of the pixels. Hence, the transmissivities would be vibrated with uniform time variation and amplitude for all the pixels. As a result, variations in tone among pixels are suppressed and non-uniformity for display is avoided.

In the image display device, the light source is a solid-state light source, and the light transmission unit is a drive circuit that forces the solid-state light source to blink periodically.

Otherwise, it is desirable that the light source is a gas-luminous type light source, and the light transmission unit is a light block unit that periodically blocks light from the gas-luminous type light source. These configurations enable the light to surely pass through the liquid crystal panel only for a predetermined length of time in the frame cycle.

In the invention, an LED (Light Emitting Diode) can preferably be used as the solid-state light source, and as the gas-luminous type light source, a metal halide lamp, halogen lamp, high-pressure mercury vapor lamp, or the like are used preferably.

Further, as the light block unit are preferably used a rotary light-shielding plate having a plurality of transmission slits provided at equally spaced intervals on a circumference of a disc-like rotating body, or a plurality of polarizing plates that can be superposed on each other in the condition where their grating axes are made coincident with each other or crossed at a predetermined angle.

The image display device may be provided with a light-polarizing unit that scans an entire region of the liquid crystal panel within the frame cycle through a light transmission target region, wherein the light transmission unit may be arranged so as to allow light to pass through the pixels located in a region subjected to light transmission only for a predetermined length of time in the frame cycle. In this case, it is possible to display an image through light irradiation of a region.

Particularly, for the purpose of further increasing the efficiency of use of light, it is preferable that the light-polarizing unit is a polygon mirror.

It is preferable that the image display device further includes a light-condensing unit that condenses light from the light source and irradiates the light-polarizing unit with the condensed light, whereby the efficiency of use of light from the light source can be increased.

A method of driving a liquid crystal panel according to an aspect of the invention, can include the steps of having light from a light source passing through pixels only for a predetermined length of time in a frame cycle of an image, generating a drive signal to periodically vibrate a transmissivity for each pixel of the liquid crystal panel, and controlling in phase the drive signal based on tone data carried by an image signal, wherein the steps are executed by a driving device that drives the liquid crystal panel.

The method of driving a liquid crystal panel of the image display device that has been described above can offer the same effect and advantage as those described for the image display device.

In the method of driving a liquid crystal panel, when light transmission in a current frame cycle is performed in a rising edge of the vibrating transmissivity, the driving device delays in phase the drive signal and performs light transmission in a subsequent frame cycle in a rising edge of the vibrating transmissivity.

According to the aspect of the invention, a large transmissivity can be changed to a smaller one in the subsequent frame cycle.

In the method of driving a liquid crystal panel, when light transmission in a current frame cycle is performed in a rising edge of the vibrating transmissivity, the driving device delays in phase the drive signal and performs light transmission in a subsequent frame cycle in a falling edge of the vibrating transmissivity.

According to the aspect of the invention, a small transmissivity can be changed to a larger one in the subsequent frame cycle, and a large transmissivity can be changed to a smaller one in the subsequent frame cycle depending on the phase condition in the current frame cycle and the extent of phase delay in the subsequent frame cycle.

In the method of driving a liquid crystal panel, when light transmission in a current frame cycle is performed in a falling edge of the vibrating transmissivity, the driving device delays in phase the drive signal and performs light transmission in a subsequent frame cycle in a rising edge of the vibrating transmissivity.

According to the aspect of the invention, a large transmissivity can be changed to a smaller one in the subsequent frame cycle, and a small transmissivity can be changed to a larger one in the subsequent frame cycle depending on the phase condition in the current frame cycle and the extent of phase delay in the subsequent frame cycle.

In the method of driving a liquid crystal panel, when light transmission in a current frame cycle is performed in a falling edge of the vibrating transmissivity, the driving device delays in phase the drive signal and performs light transmission in a subsequent frame cycle in a falling edge of the vibrating transmissivity.

According to the aspect of the invention, a small transmissivity can be changed to a larger one in the subsequent frame cycle reversely.

In the method of driving a liquid crystal panel, a transmitted light amount may be changed according to tone data carried by the image signal, whereby the range of the tone can be enlarged.

Now, what is conceivable in order to make a light amount variable is to change the time periods during which lights travel through the liquid crystal panel in a frame cycle and/or the brightness of light.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Figure 1:
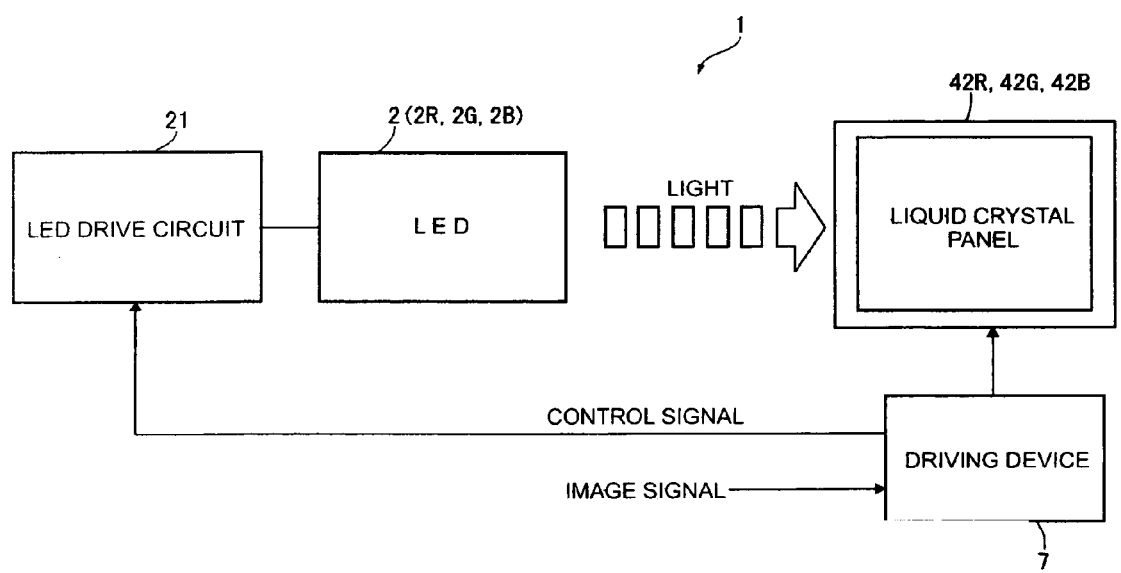
FIG. 1 is a block diagram showing a schematic configuration of an image display device according to the first exemplary embodiment of the invention.

Exemplary embodiments of the invention will be described below with reference to the drawings. Here, it is noted that in the second and third exemplary embodiments, which are to be described later, the same constituent or a constituent having the same function as that of the first exemplary embodiment is identified by the same reference character, and the description thereof is omitted or simplified in the second and third embodiments.

Figure 2:
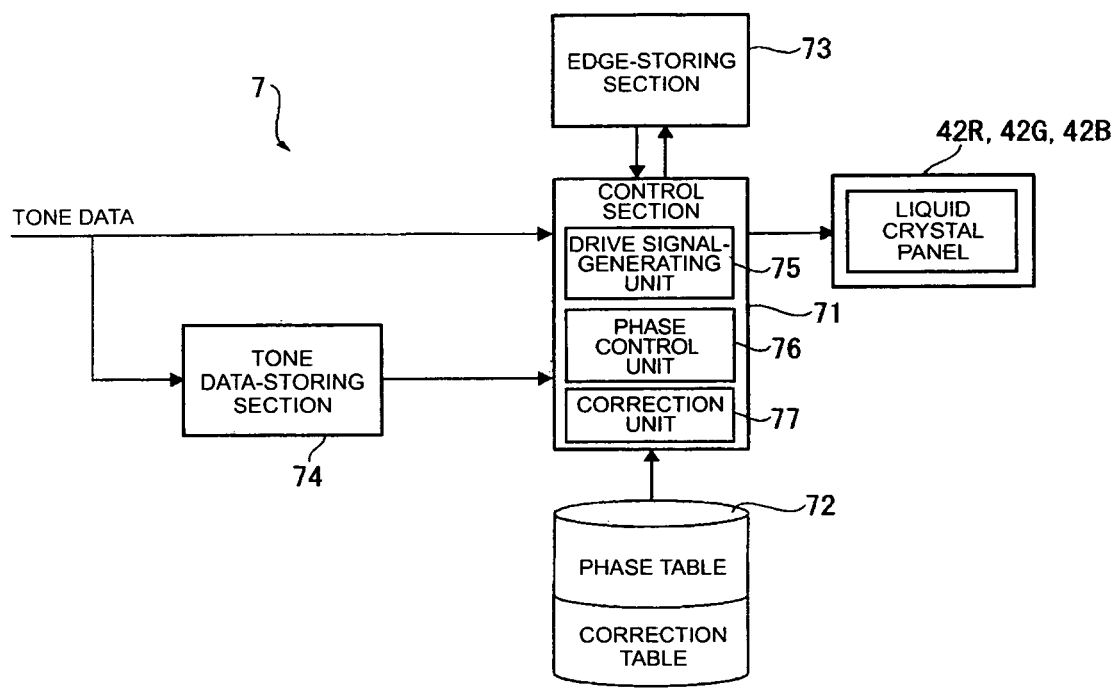
FIG. 2 is a block diagram showing a main part of the configuration of the image display device according to the first exemplary embodiment.
Figure 3:
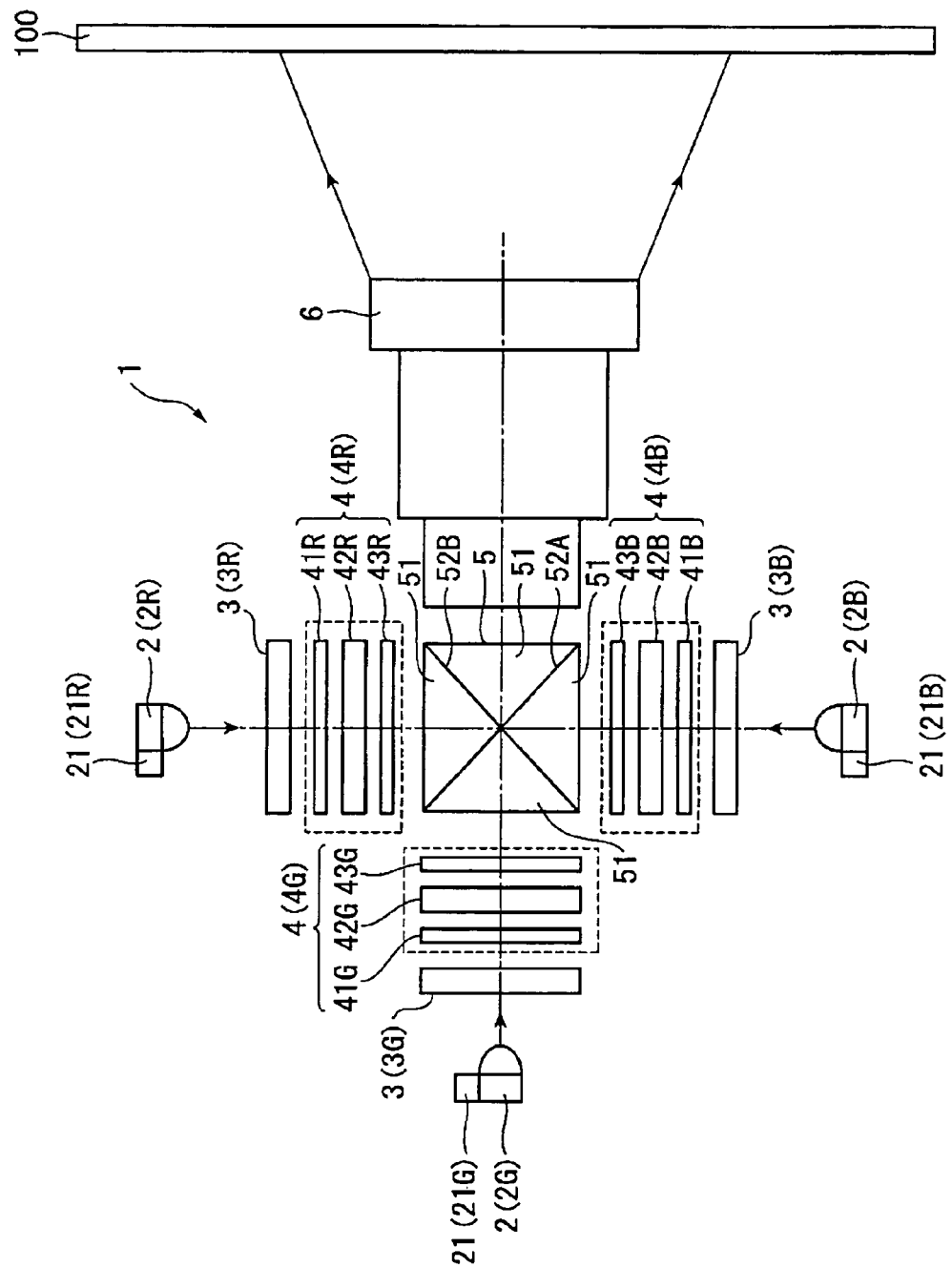
FIG. 3 is a plan view schematically showing an important part of the image display device.

FIG. 1 is a block diagram showing a schematic configuration of a liquid crystal projector 1 used as an image display device according to the first embodiment of the invention. FIG. 2 is a block diagram showing a main part of the configuration of the liquid crystal projector 1. FIG. 3 is a plan view schematically showing an important part of the liquid crystal projector 1.

As in FIGS. 1 and 3, the liquid crystal projector 1 is of 3-panel LCD type, which includes: a set of three polarizing devices 3 (3R, 3G, 3B); a set of three electro-optic devices 4 (4R, 4G, 4B); a cross dichroic prism 5; a projection lens 6; and a driving device 7. The liquid crystal projector 1 modulates a light beam, which each LED 2 (2R, 2G, 2B) used as a solid-state light source emits, according to an image signal of a still image or moving image to form an optical image, and enlarges and projects the formed optical image onto a screen 100.

Each LED 2 is driven by an LED drive circuit 21 (21R, 21G, 21B) as a light transmission unit, and performs intermittent lighting, during which lighting and extinguishment thereof are repeated, and emits a light beam toward the polarizing device 3. The LEDs 2R, 2G and 2B emit red, green and blue lights, respectively. The set of LEDs 2 is constituted by LED elements that are light-emitting solid-state elements arrayed on a Si substrate. The LED drive circuit 21 applies a drive voltage to the LED elements according to a control signal from a driving device 7, which is to be described in greater detail below.

The set of polarizing devices 3 is constituted by three polarizing devices 3R, 3G, 3B, which correspond to the respective color lights emitted by the LEDs 2. Each polarizing device 3 aligns a color light emitted by the LED 2 in its polarizing direction into a linearly polarized light that is polarized substantially in one direction. In the embodiment, the polarizing devices 3R, 3B align respective red and blue lights emitted by the LED 2R, 2B into P-polarized light beams and let out the resultant beams. The polarizing device 3G aligns a green light emitted by the LED 2G into an S-polarized light beam and lets out the resultant beam.

The set of electro-optic devices 4 can be constituted by three electro-optic devices 4R, 4G, 4B corresponding to the individual color lights that the polarizing devices 3R, 3G, 3B let out. The electro-optic devices 4R, 4G, 4B are driven and controlled by the driving device 7 to be described in greater detail below. The electro-optic devices 4R, 4G, 4B change light transmissivities for light beams that the polarizing devices 3R, 3G, 3B let out according to tone data carried by an input image signal, and modulate the incident color lights to form optical images. The set of electro-optic devices 4 includes: three incident-side polarizing plates 41R, 41G, 41B; three liquid crystal panels 42R, 42G, 42B; and three output-side polarizing plates 43R, 43G, 43B.

While specific illustration of the liquid crystal panels 42R, 42G, 42B in the electro-optic devices 4 is omitted, the liquid crystal panels 42R, 42G, 42B each include a pair of transparent glass substrates, and a liquid crystal, as an electro-optic material, sealed in between the paired transparent glass substrates. The liquid crystal panels 42R, 42G, 42B are controlled for each pixel, in orientation condition of the liquid crystal, i.e. transmissivity, according to a drive signal supplied from the driving device 7, and modulate, in polarizing direction, polarized light beams that the corresponding incident-side polarizing plates 41R, 41G, 41B let out.

The cross dichroic prism 5 is an optical element that combines optical images from the electro-optic devices 4R, 4G, 4B modulated separately for individual color lights, and forms a color image. The cross dichroic prism 5 has a substantial square form in plan view, which is composed of four right-angle prisms 51 bonded together. At the interfaces between the right-angle prisms 51 resulting from bonding them together, dielectric multilayer films 52A, 52B are formed.

The projection lens 6 enlarges a color image formed in the cross dichroic prism 5 and projects the enlarged image onto the screen 100. The projection lens 6 is made as an assembled lens by assembling a plurality of lenses, and accommodated in a lens barrel.

Figure 4:
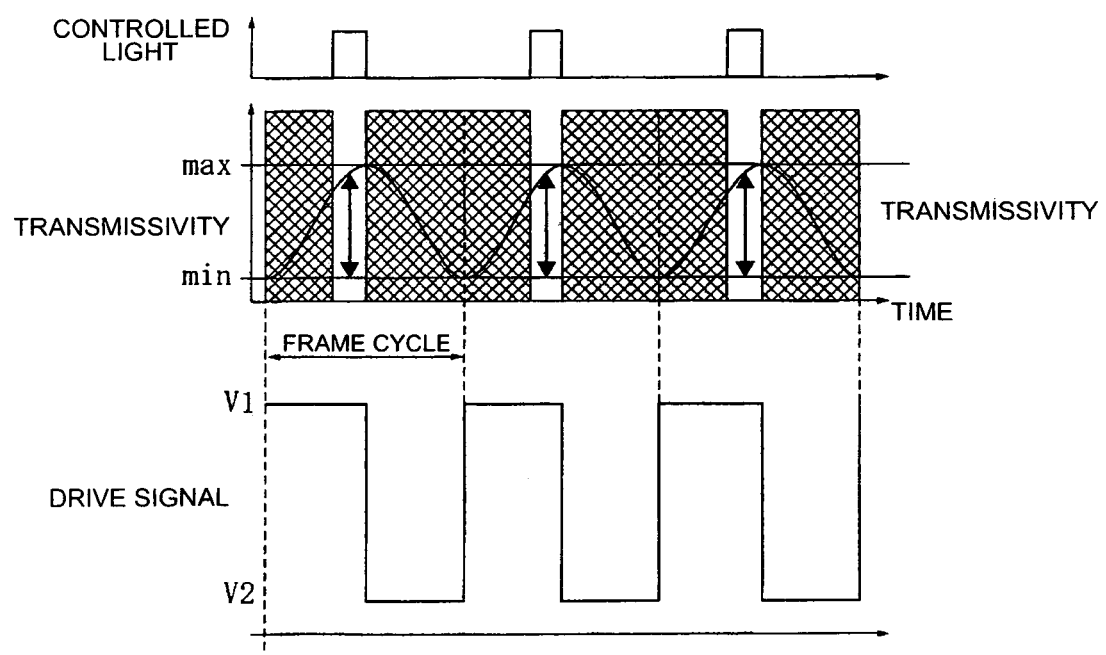
FIG. 4 is a time chart of assistance in explaining the principle of expressing a tone.

The driving device 7 is arranged so that it can apply a drive signal to the liquid crystal panels 42R, 42G, 42B. The drive signal is successively output as a rectangular wave composed of two kinds of different voltage levels V1, V2, as shown in FIG. 4. The values of the voltage levels V1, V2 are essentially independent of tone data that an image signal carries, and are never changed according to the tone data.

In other words, the curve showing the change in transmissivity as in FIG. 4 may be regarded as showing the response characteristic of a normally black type liquid crystal with respect to drive signals. The transmissivity is vibrated periodically by successively applying drive signals of voltage levels V1, V2, in which the response characteristic is utilized. In this case, the voltage levels V1, V2 are set so that when the output cycle of drive signals is synchronized with the frame cycle, the frame cycle coincides with the vibrating cycle of transmissivity (i.e. the cycle when the transmissivity is being vibrated exactly between the maximum "max" and minimum "min").

According to the principle of expressing a tone in the exemplary embodiment, as shown in FIG. 4, LED 2 is lighted only for a predetermined length of time within a frame cycle (see controlled light), and the transmissivity at the time of the lighting is used to express a tone. A crosshatched portion in the drawing means a time period during which light is not transmitted. (This is applied to the other drawings.) Therefore, other tones can be expressed by the following procedure. That is, a drive signal is changed in phase to change in phase the vibrating cycle of the transmissivity, thereby changing the transmissivity at the time of lighting the LED 2. In the exemplary embodiment, the phase of the vibrating cycle of the transmissivity can be delayed to change the transmissivity only by delaying in phase the output cycle of drive signals, in consideration of the response characteristic with respect to drive signals.

Figure 5:
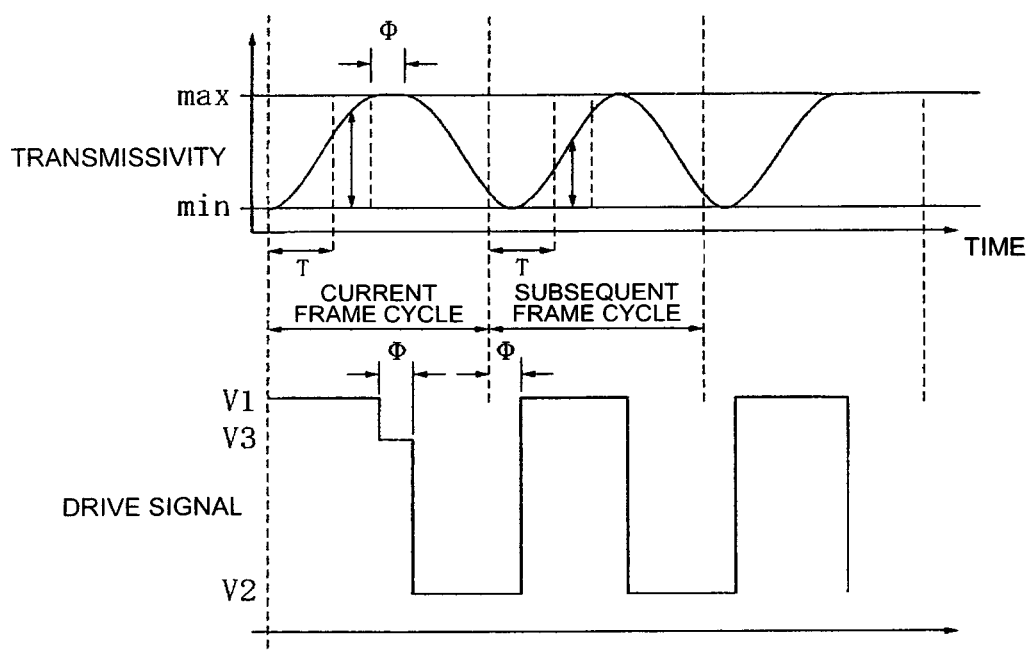
FIG. 5 is a time chart of assistance in explaining the change in tone based on delay in phase of a drive signal.

For example, FIG. 5 shows that when the phase of output cycle of drive signals is delayed by Φ, the vibrating cycle of the transmissivity is also delayed by the phase Φ. In this case, in the subsequent frame cycle the transmissivity will rise behind the timing with which it rises in the current frame cycle. Hence, when the time T when the LED 2 is lighted is common for the individual frame cycles, the transmissivity in the subsequent frame cycle becomes smaller as shown by a double-headed arrow in the drawing, which makes it possible to express a darker tone.

Incidentally, the voltage level V3 to delay the output cycle of drive signals is slightly smaller than the voltage level V1. The reason for this is that the larger voltage level V1 causes the transient response in the transmissivity. In other words, if the phase is delayed with the drive signal voltage level kept at V1, the transmissivity would exceed "max" and therefore it could not be stabilized at the value of "max".

Figure 6:
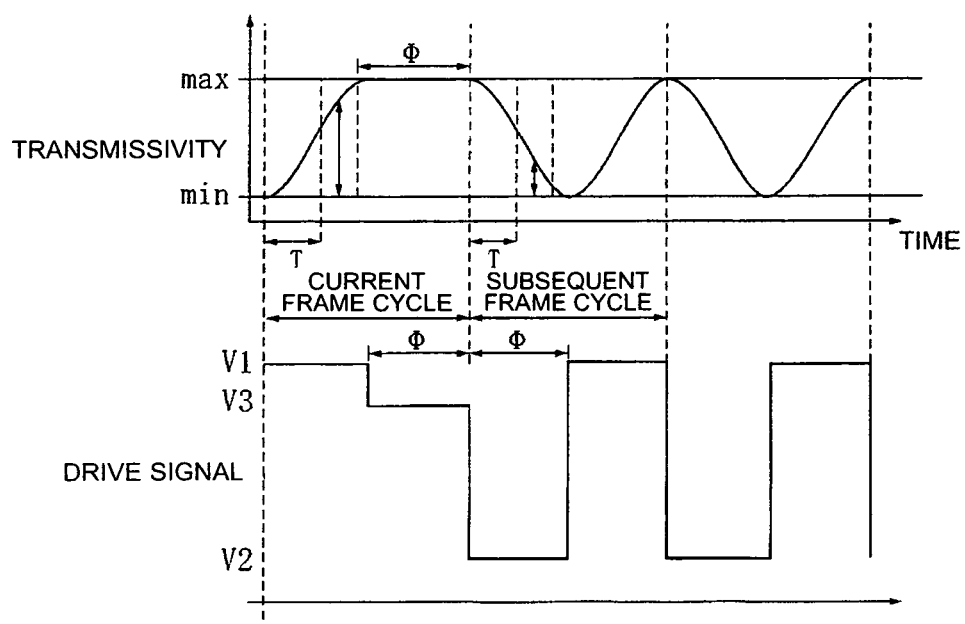
FIG. 6 is a time chart of assistance in explaining the change in tone based on phase inversion of a drive signal.

Further, FIG. 6 shows that the vibrating cycle of the transmissivity is inverted in phase. The phase inversion can be realized by delaying in phase the output cycle of drive signals. By doing so, for example, even when a rising edge portion of the transmissivity is utilized to express a tone in the current frame cycle, a falling edge portion of the transmissivity can be utilized to express a tone in the subsequent frame cycle. Moreover, in the case shown by FIG. 6, it is shown that the phase is delayed significantly and as such, the transmissivity can be made smaller in the subsequent frame cycle, and thus a darker tone can be expressed.

While it has been described with reference to FIGS. 5 and 6 that the output cycle of drive signals is delayed in phase to make the transmissivity smaller, whereby a darker tone is expressed, it is naturally conceivable that the transmissivity is made larger to express a brighter tone. Also, it can be conceived that a falling edge portion of the transmissivity is utilized for light transmission in the current frame cycle to express a tone. Therefore, in order to change in phase the drive signal thereby to realize an arbitrary transmissivity or tone, cases may be classified as follows in general:

Case (1) where a rising edge of the vibrating transmissivity is utilized for light transmission in the current frame cycle, and a rising edge thereof is utilized for light transmission also in the subsequent frame cycle;

Case (2) where a rising edge of the vibrating transmissivity is utilized for light transmission in the current frame cycle, and a falling edge thereof is utilized for light transmission in the subsequent frame cycle;

Case (3) where a falling edge of the vibrating transmissivity is utilized for light transmission in the current frame cycle, and a rising edge thereof is utilized for light transmission in the subsequent frame cycle; and Case (4) where a falling edge of the vibrating transmissivity is utilized for light transmission in the current frame cycle, and a falling edge there is utilized for light transmission in the subsequent frame cycle.

Figure 7:
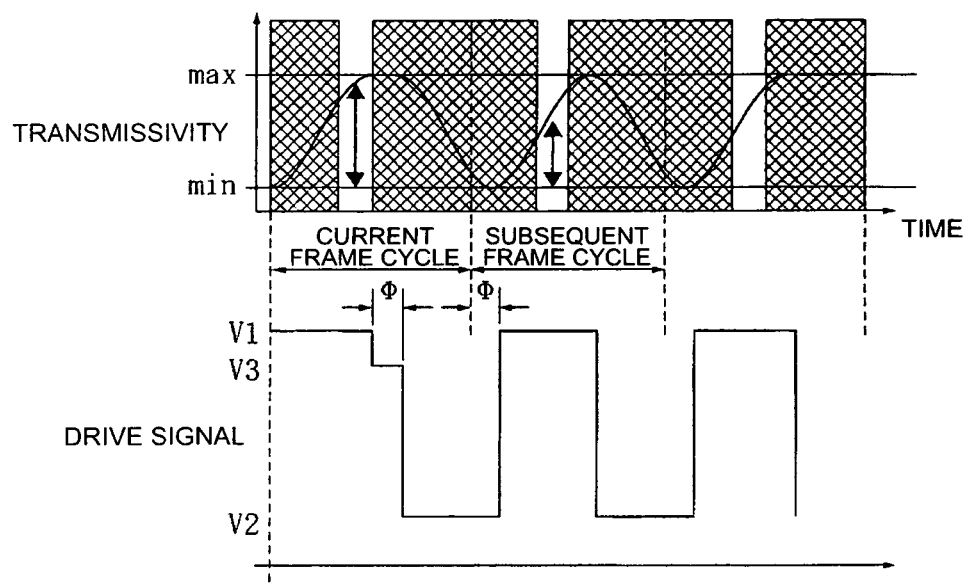
FIG. 7 is a time chart of assistance in explaining the change in tone to a darker tone based on delay in phase of a drive signal.

With reference to FIG. 7, Case (1) will be described. The extent of phase delay shown in FIG. 7 is substantially the same as that shown in FIG. 5. As clear from the drawing, when a rising edge of the vibrating transmissivity is utilized for light transmission in the current frame cycle, and a rising edge thereof is utilized for light transmission in the subsequent frame cycle, the transmissivity in the subsequent frame can be made smaller than that in the current frame, which enables display with a darker tone, as described with reference to FIG. 5.

Figure 8:
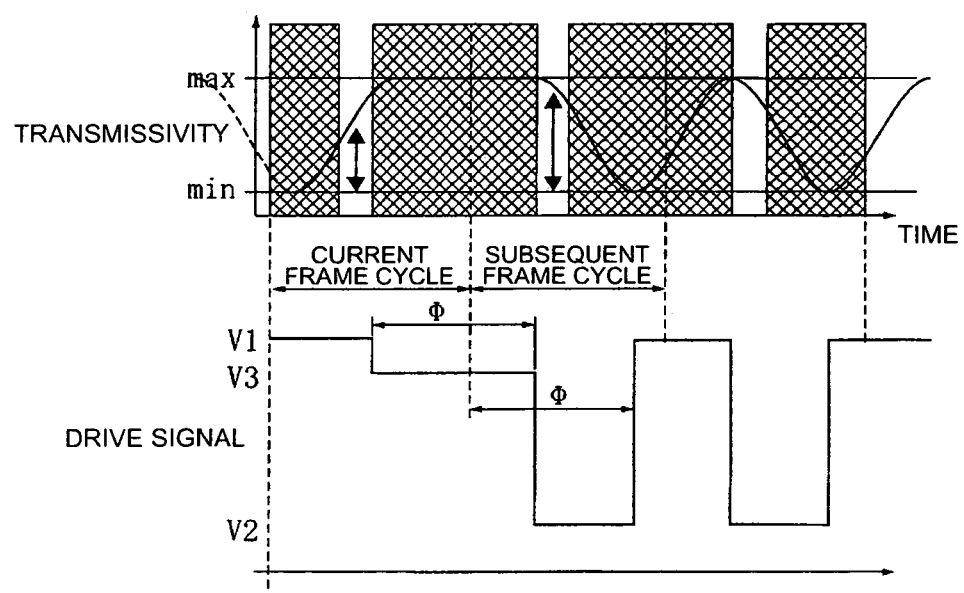
FIG. 8 is a time chart of assistance in explaining the change in tone to a brighter tone based on phase inversion of a drive signal.

With reference to FIG. 8, Case (2) will be described. The following is shown from the drawing. To perform light transmission in a falling edge of the vibrating transmissivity in the subsequent frame cycle when a rising edge thereof is utilized for light transmission in the current frame cycle, the extent of phase delay may be made larger to invert the phase. This can make the transmissivity in the subsequent frame cycle larger than that in the current frame cycle to enable display with a brighter tone.

Depending on the phase condition in the current frame cycle and the extent of phase delay in the subsequent frame cycle, the transmissivity in the subsequent frame cycle can be made smaller than that in the current frame cycle as shown in FIG. 6, which enables display with a darker tone. However, slightly delaying the phase can change the transmissivity from a large value to a small value, as described in Case (1) and as such, it is preferable that Case (2) is applied only when it is desired to change the transmissivity from a small value to a large value.

Figure 9:
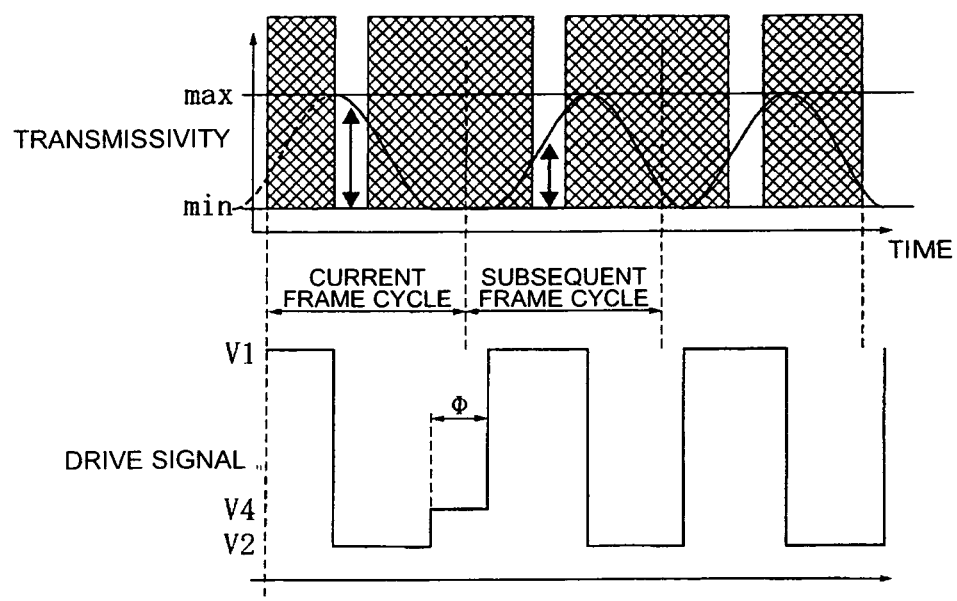
FIG. 9 is a time chart of assistance in explaining the change in tone to a darker tone based on phase inversion of a drive signal.

With reference to FIG. 9, Case (3) will be described. The following is shown from the drawing. To perform light transmission in a rising edge of the vibrating transmissivity in the subsequent frame cycle when a falling edge thereof is utilized for light transmission in the current frame cycle, the extent of the delay in phase may be made larger to invert the phase in addition to delaying the drive signal in phase when the voltage level is V2. This can make the transmissivity in the subsequent frame cycle smaller than that in the current frame cycle to enable display with a darker tone.

While illustration is omitted, depending on the phase condition in the current frame cycle and the extent of phase delay in the subsequent frame cycle, the transmissivity in the subsequent frame cycle can be made larger than that in the current frame cycle, which enables display with a brighter tone. However, slightly delaying the phase can change the transmissivity from a small value to a large value as described below in connection with Case (4) and as such, it is preferable that Case (3) is applied only when it is desired to change the transmissivity from a large value to a small value.

Incidentally, the voltage level V4 to delay the output cycle of drive signals is slightly higher than the voltage level V2. The reason for this is that the smaller voltage level V2 causes the transient response in the transmissivity. In other words, if the phase is delayed with the drive signal voltage level kept at V2, the transmissivity would fall below "min" and therefore it could not be stabilized at the value of "min".

Figure 10:
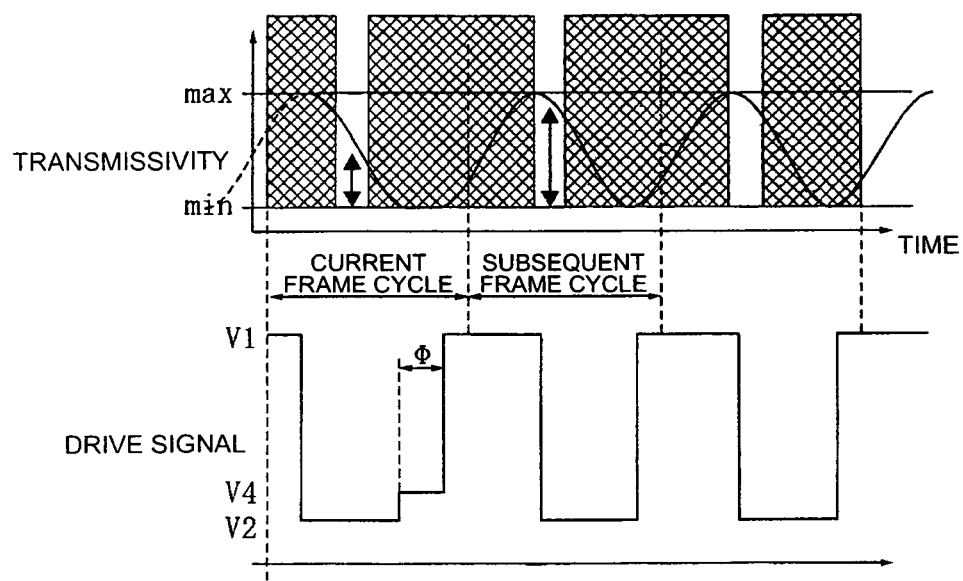
FIG. 10 is a time chart of assistance in explaining the change in tone to a brighter tone based on delay in phase of a drive signal.

With reference to FIG. 10, Case (4) will be described. The following is shown from the drawing. To perform light transmission in a falling edge of the vibrating transmissivity in the subsequent frame cycle when a falling edge thereof is utilized for light transmission in the current frame cycle, the phase may be delayed slightly. This can make the transmissivity in the subsequent frame cycle larger than that in the current frame cycle to enable display with a brighter tone.

The phase control of drive signals as described above is performed by the driving device 7. A configuration of the driving device 7 will be described below in detail with reference to the block diagram shown in FIG. 2.

The driving device 7 can be arranged as a driver including a part that generates a control signal to be sent to the LED drive circuit 21 shown in FIG. 1, a part that controls the liquid crystal panels 42R, 42G, 42B, and a part that drives and controls another constituent of the liquid crystal projector 1. Of those parts, the part that controls the liquid crystal panels 42R, 42G, 42B is shown in FIG. 2.

As shown in FIG. 2, the driving device 7 has a control section 71, a table-storing section 72, an edge-storing section 73, and a tone data-storing section 74.

In the control section 71 are provided: a drive signal-generating unit 75 that generates a drive signal to be sent to the liquid crystal panels 42R, 42G, 42B; a phase control unit 76 that controls in phase the drive signal according to tone data carried by an image signal; and a correction unit 77 that corrects a voltage level of the drive signal so that time variations in transmissivities of individual pixels included by the liquid crystal panels 42R, 42G, 42B are made uniform for each pixel.

The drive signal-generating unit 75 of the control section 71 has the function of generating drive signals of voltage levels V1-V4 to output the signals to the liquid crystal panels 42R, 42G, 42B. When an image is displayed with a changed tone in the subsequent frame cycle, the drive signal-generating unit 75 delays the drive signal in phase based on the extent of delay determined according to the tone. This enables tone expression regardless of the response characteristics of liquid crystal panels 42R, 42G, 42B and can prevent the development of quality degradation such as "tailing" and "blurring" due to the time response of each pixel. In addition, the tone can be changed from a bright condition to a dark condition (or from a dark condition to a bright condition) in an instant, and therefore sharp switching of tone can be realized.

The phase control unit 76 determines the extent of phase delay in the subsequent frame cycle with respect to the phase condition in the current frame cycle (i.e. what extent of phase delay can offer the targeted transmissivity) when an image is displayed with a changed tone in the subsequent frame cycle. Then, the phase control unit 76 outputs the resultant extent of delay to the drive signal-generating unit 75 and outputs it in a control signal to the LED drive circuit 21 shown in FIG. 1.

Specifically, tone data in the current frame cycle is stored in the tone data-storing section 74, and the edge-storing section 73 stores, as a timing of light transmission, the information on whether the light transmission in the current frame cycle is made in a rising edge or a falling edge. Then, the extent of phase delay in the subsequent frame cycle is determined based on the result of comparison between the tone data stored in the current frame cycle and the tone data in the subsequent frame cycle, which is input in real time, and the timing of light transmission in the current frame cycle. In other words, relations between the extent of phase delay and the result of the comparison and transmission timing have been previously held in a phase table by the table-storing section 27, and the extent of phase delay is determined with reference to the phase table.

Now, the function that the correction unit 77 has will be described. In general, pixels that the liquid crystal panels 42R, 42G, 42B include differ from one another, for example, in time response characteristics of transmissivity with respect to applied voltages because of their variations in quality, etc. Therefore, even when drive signals of a uniform voltage level are applied to the pixels, the transmissivity can reach above the value "max" or below the value "min" in some pixels, and stay below the value "max" and above the value "min" in some pixels, and thus vibrating condition of the transmissivity differs pixel to pixel, causing non-uniformity in displaying an image. Hence, the correction unit 77 corrects the voltage level of a drive voltage with a correction value adapted to the characteristic of each pixel (γ correction) and applies the corrected drive signal to the pixel thereby to achieve the condition where the transmissivities for all the pixels vibrate between "max" and "min" correctly. Correction values for the pixels have been previously held in a correction table by the table-storing section 27.

Now, with reference to the flow chart of FIG. 11, the flow in changing the tone will be described.

Figure 11:
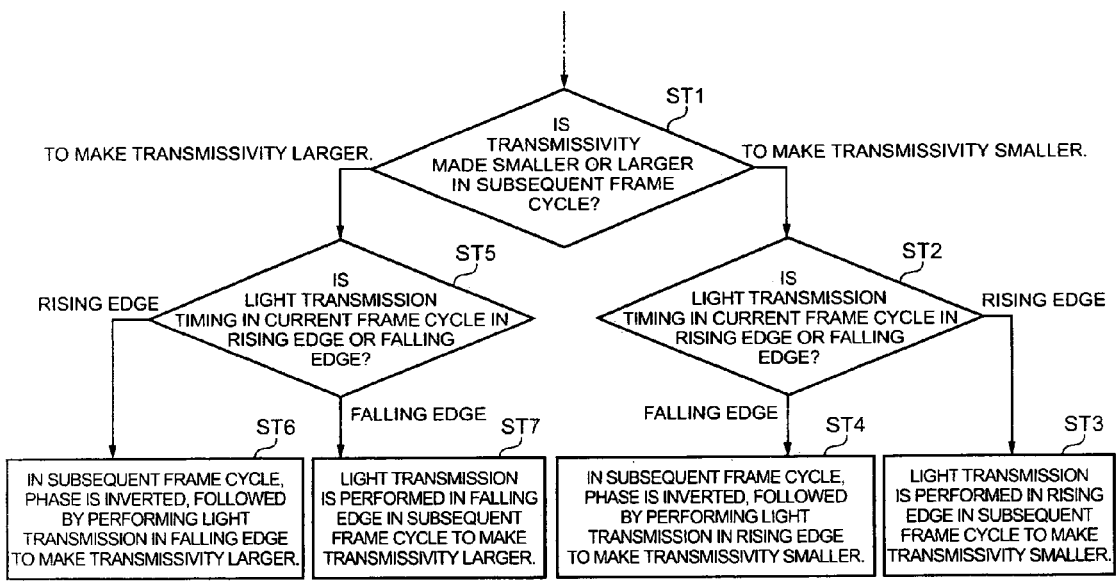
FIG. 11 is a flow chart showing a flow in changing the tone.

As shown in FIG. 11, first, the phase control unit 76 judges whether to make the transmissivity in the subsequent frame cycle smaller or larger than that in the current frame cycle based on the comparison of tone data when changing the tone in the subsequent frame cycle (Step ST1).

As a result of the comparison, when the transmissivity in the subsequent frame cycle is to be made smaller, the timing of light transmission in the current frame cycle is invoked from the edge-storing section 73 to judge whether light transmission in the current frame cycle has been performed in a rising edge or a falling edge of the vibrating transmissivity curve (Step ST2). If light transmission has been performed in a rising edge of the vibrating curve, light transmission is performed in a rising edge thereof also in the subsequent frame cycle to make the transmissivity smaller and display an image with a darker tone (Step ST3). In contrast, if it has been judged at ST2 that light transmission has been performed in a falling edge of the vibrating curve, the phase is inverted, followed by performing light transmission in a rising edge in the subsequent frame cycle to make the transmissivity smaller and display an image with a darker tone (Step ST4).

On the other hand, if it has been judged at ST1 that the transmissivity in the subsequent frame cycle is made larger, the timing of light transmission in the current frame cycle is invoked from the edge-storing section 73 to judge whether light transmission in the current frame cycle has been performed in a rising edge or a falling edge of the vibrating transmissivity curve (Step ST5). As a result, if it has been judged that light transmission has been performed in a rising edge of the vibrating curve, in the subsequent frame cycle the phase is inverted, followed by performing light transmission in a falling edge thereby to make the transmissivity larger and display an image with a brighter tone (Step ST6). In contrast, if it has been judged at ST5 that light transmission has been performed in a falling edge of the vibrating curve, light transmission is performed in a falling edge in the subsequent frame cycle thereby to make the transmissivity larger and display an image with a brighter tone (Step ST7).

In the case of display with the same tone, the transmissivity in the subsequent frame cycle is the same as that in the current frame cycle and as such, it is not necessary to make the phase control unit 76 functioning. In this case, the drive signal-generating unit 75 may be made to output a drive signal of the same phase.

The exemplary embodiment has been described under the condition that the liquid crystal panels 42R, 42G, 42B are of normally black type. However, even in the case where the liquid crystal panels are of normally white type, the principle of phase control is unchanged.

Figure 12:
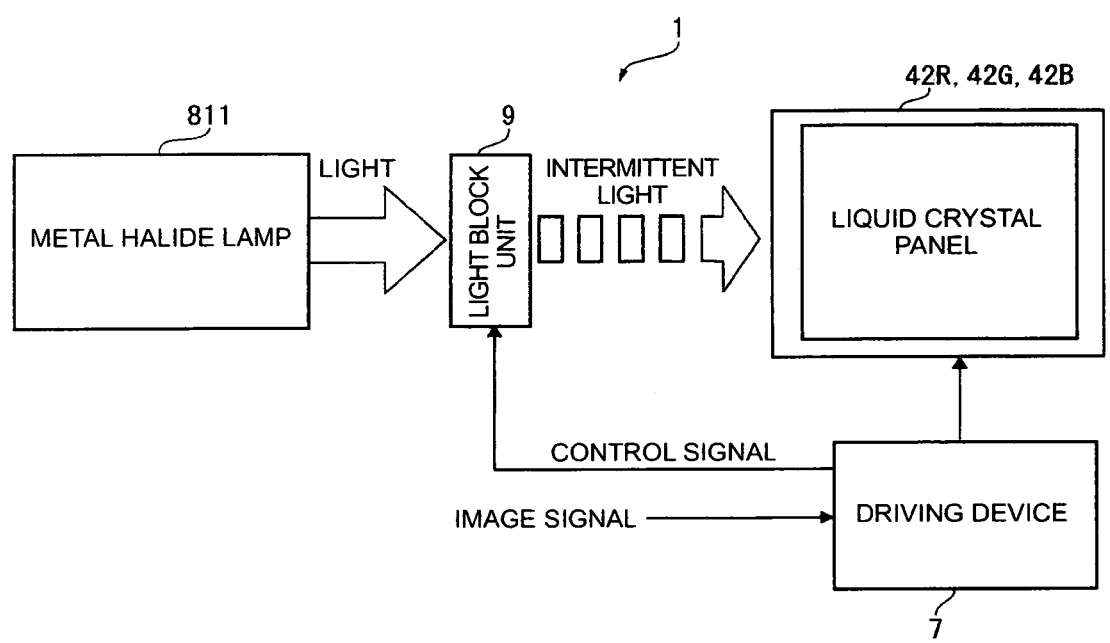
FIG. 12 is a block diagram showing a schematic configuration of an image display device according to the second exemplary embodiment.
Figure 13:
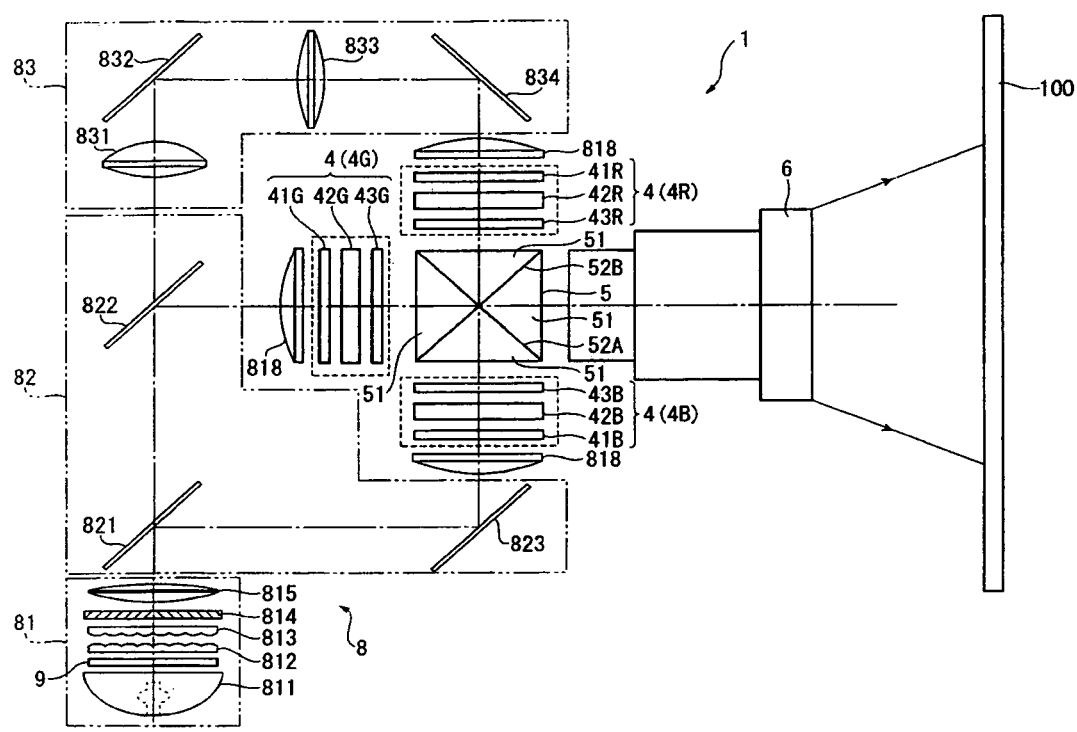
FIG. 13 is a plan view schematically showing an important part of the image display device according to the second exemplary embodiment.

FIG. 12 is a block diagram showing a schematic configuration of a liquid crystal projector 1, which is an image display device according to the second exemplary embodiment of the invention. FIG. 13 is a plan view schematically showing an important part of the liquid crystal projector 1.

In the liquid crystal projector 1 according to the exemplary embodiment, a metal halide lamp 811, which is a gas-luminous type light source, is used as a light source, and as a light transmission unit is used a light block unit 9 that periodically blocks light emitted by the metal halide lamp 811. In these respects, the second exemplary embodiment is different in configuration from the first exemplary embodiment widely.

The gas-luminous type light source may be any of a halogen lamp and a high-pressure mercury vapor lamp in addition to a metal halide lamp 811.

Further, as the light block unit 9 may be adopted a rotary light-shielding plate having a plurality of transmission slits provided at equally spaced intervals on a circumference of a disc-like rotating body or a plurality of polarizing plates that can be superposed on each other in the condition where their grating axes are made coincident with each other or crossed at a predetermined angle.

Specifically, the metal halide lamp 811 and the light block unit 9 are housed in an optical unit 8 shown in FIG. 13. Other constituents of the optical unit 8 will be described in detail below.

The optical unit 8 includes an integrator-illuminating optical system 81, a color-separator optical system 82, and a relay optical system 83. The integrator-illuminating optical system 81 is an optical system intended to illuminate image-forming regions of the liquid crystal panels 42R, 42G, 42B substantially uniformly. The integrator-illuminating optical system 81 can include the above-described metal halide lamp 811, the above-described light block unit 9, a first lens array 812, a second lens array 813, a polarizing element 814, and a superimposing lens 815. The place where the light block unit 9 is disposed may be in a stage behind the superimposing lens 815, and therefore the place may be appropriately determined according to the specific configuration of the light block unit 9.

The first lens array 812 has a structure in which small lenses are arrayed in a matrix, provided that the small lenses each has a substantial rectangular outline when viewed in a direction of the optical axis. The small lenses serve to divide a light beam emitted by the metal halide lamp 811 into a plurality of secondary light beams.

The second lens array 813 has a structure substantially the same as that of the first lens array 812, in which small lenses are arrayed in a matrix. The second lens array 813 serves to focus images by the small lenses of the first lens array 812 onto the liquid crystal panels 42R, 42G, 42B together with the superimposing lens 815.

The polarizing element 814 is disposed between the second lens array 813 and the superimposing lens 815, and serves to convert a light coming from the second lens array 813 into substantially one kind of polarized light.

The color-separator optical system 82 can include two dichroic mirrors 821, 822, and a reflection mirror 823. The color-separator optical system has the function of separating the secondary light beams, which the integrator-illuminating optical system 81 has let out, into three color lights of red, green and blue through the dichroic mirrors 821, 822.

The relay optical system 83 can include an incident side lens 831, a relay lens 833, and reflection mirrors 832, 834, and has the function of guiding a red light separated by the color-separator optical system 82 to the liquid crystal panel 42R.

With the optical unit 8 as described above, a blue light component of a light beam that the integrator-illuminating optical system 81 has let out is reflected by the dichroic mirror 821, and red and green light components pass through the dichroic mirror 821. The blue light reflected by the dichroic mirror 821 is reflected by the reflection mirror 823, and travels through a field lens 818 and then reaches the liquid crystal panel 42B. The field lens 818 converts secondary light beams that the second lens array 813 has let out into light beams in parallel with their center axis (main light beam). Also, other field lenses 818 provided on the incident sides of the liquid crystal panels for green light and red light function in the same way.

Of red and green lights that have passed through the dichroic mirror 821, the green light is reflected by the dichroic mirror 822, and travels through the field lens 818 and reaches the liquid crystal panel 42G. On the other hand, the red light passes through the dichroic mirror 822, travels through the relay optical system 83 and through the field lens 818, and reaches the liquid crystal panel 42R.

In the exemplary embodiment, the driving device 7 can be arranged so as to output a control signal for driving control of the light block unit 9. According to the control signal, the light block unit 9 releases light at a predetermined light transmission timing T in a frame cycle (see FIGS. 5 and 6), and thus the liquid crystal panels 42R, 42G, 42B are irradiated with the light periodically and intermittently.

The other functions that the driving device 7 has are the same as those in the first embodiment and as such, their descriptions are omitted here. The advantage of the invention can be achieved by using the driving device 7 to control in phase a drive signal as in the case of the first embodiment.

Figure 14:
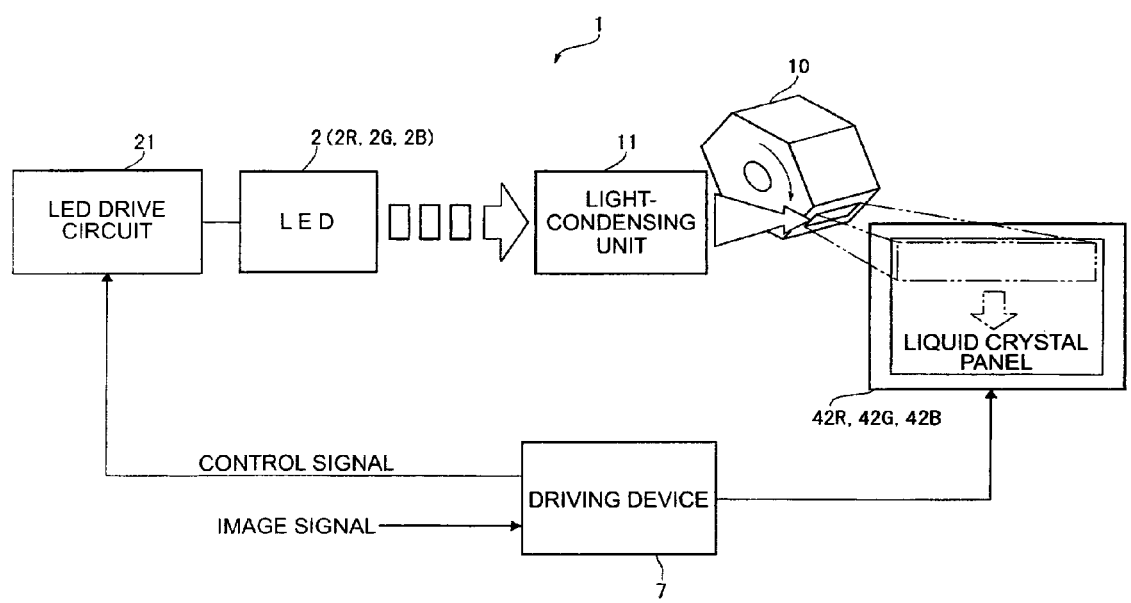
FIG. 14 is a block diagram showing a schematic configuration of an image display device according to the third exemplary embodiment.

A liquid crystal projector 1 according to the third exemplary embodiment of the invention shown in FIG. 14 has an LED 2 used as a light source and an LED drive circuit 21 as a light transmission unit, as in the case of the first exemplary embodiment. In addition, the liquid crystal projector 1 has polygon mirrors 10 each provided as a light-polarizing unit between the LED 2 and the liquid crystal panels 42R, 42G, 42B, and light-condensing units 11 each composed of a condenser lens or the like and provided in a stage before the corresponding polygon mirror 10 to increase the efficiency of use of light. In the liquid crystal projector 1 of 3-panel LCD type with liquid crystal panels 42R, 42G, 42B, three sets of the polygon mirror 10 and the light-condensing unit 11 are provided respectively corresponding to the liquid crystal panels 42R, 42G, 42B.

According to this exemplary embodiment, a light beam condensed by the light-condensing unit 11 passes through a predetermined region of each of the liquid crystal panels 42R, 42G, 42B under the influence of the polygon mirror 10 (see the region surrounded by a dashed-and-double-dotted line in the drawing). Scanning over the entire region of the irradiated surface is performed while the transmission region is being moved by rotating the polygon mirror 10, and thus an image representing one frame is displayed. Also, according to this embodiment, the advantage of the invention can be achieved by controlling in phase a drive signal as in the case of the first embodiment.

It should be understood that the invention is not limited by the above exemplary embodiments, and it can include modifications and improvements thereof within a scope that allows the advantage of the invention to be achieved.

For example, the time periods during which lights travel through the liquid crystal panels 42R, 42G, 42B in the embodiments represent one frame cycle, and they are the same. However, the driving device may not only change the phase of a drive signal, but also change the light transmission periods for each frame cycle or the brightness of the light source to change the transmitted light amount and therefor change the tone.

In addition, while the timings of light transmission T are the same in the individual frame cycles, as described with reference to FIGS. 5 and 6, the driving device may not only change the phase of a drive signal but also change the timings T to change the tone. That is, a drive signal to drive the light source may be changed in phase.

As the image display device in each of the exemplary embodiments, the liquid crystal projector 1, which is a projection type display device capable of projecting an image onto a screen 100, has been described. However, the image display device according to the invention may be a so-called liquid crystal rear projector, or may be e.g., a liquid crystal display with a backlight of not projection type but direct-view type.

While the 3-panel LCD type liquid crystal projector 1 has been described in each of the embodiments, the invention is applicable to a single-panel liquid crystal projector.

The liquid crystal panel in association with the invention may be used as a reflection-type one in addition to a transmission-type one as described in each of the embodiments.

In the third exemplary embodiment the LED 2 and LED drive circuit 21 have been adopted as a light source and a light transmission unit in the case of using the polygon mirror 10 and the light-condensing unit 11. However, instead of the LED 2 and the LED drive circuit 21, a light source composed of a gas-luminous type light source and a light transmission unit composed of a light block unit may be used as in the case of the second embodiment.

The invention relates to an image display device with a liquid crystal panel and a method of driving the liquid crystal panel, and can be utilized for e.g. various kinds of liquid crystal projectors, and a direct-view type liquid crystal display with a backlight.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image display device, comprising:
   a liquid crystal panel for displaying an image, the liquid crystal panel having plural pixels, each pixel having a respective transmissivity, the image comprising plural frames,
   a light source;
   a light transmission unit that makes a light from the light source pass through the pixels only for a length of time within a frame cycle of the image;
   a drive signal-generating unit that generates a drive signal to periodically vibrate the transmissivity of each pixel of the liquid crystal panel between a maximum value of the transmissivity and a minimum value of the transmissivity, wherein the drive signal is a successive rectangular wave including a first voltage level and a second voltage level that are independent of a tone data carried by an image signal, and that are never changed according to the tone data; and
   a phase control unit that controls the drive signal in phase based on the tone data to express a tone corresponding to the tone data.

2. The image display device of claim 1, further comprising:
   a correction unit that changes the drive signal so as to make time variations in the transmissivities of the pixels uniform.

3. The image display device of claim 1,
   the light source being a solid-state light source; and
   the light transmission unit being a drive circuit, the drive circuit forcing the solid-state light source to blink periodically.

* * * * *